(12) United States Patent
Premm et al.

(10) Patent No.: US 9,831,678 B2
(45) Date of Patent: Nov. 28, 2017

(54) METHOD FOR BLACK STARTING A POWER STATION COMPRISING A PLURALITY OF INVERTERS CONNECTABLE TO AN AC ELECTRICAL GRID

(71) Applicant: SMA Solar Technology AG, Niestetal (DE)

(72) Inventors: Daniel Premm, Kaufungen (DE); Christian Schuetz, Grebenstein (DE)

(73) Assignee: SMA Solar Technology AG, Niestetal (DE)

( * ) Notice: Subject to any disclaimer, the term of this patent is extended or adjusted under 35 U.S.C. 154(b) by 251 days.

(21) Appl. No.: 14/845,540

(22) Filed: Sep. 4, 2015

(65) Prior Publication Data

US 2015/0380942 A1    Dec. 31, 2015

Related U.S. Application Data

(63) Continuation of application No. PCT/EP2014/055109, filed on Mar. 14, 2014.

(30) Foreign Application Priority Data

Mar. 14, 2013    (DE) .................. 10 2013 102 603

(51) Int. Cl.
*H02J 3/42* (2006.01)
*H02J 3/38* (2006.01)
*H02M 7/44* (2006.01)

(52) U.S. Cl.
CPC .............. *H02J 3/383* (2013.01); *H02J 3/386* (2013.01); *H02J 3/42* (2013.01); *H02M 7/44* (2013.01); *Y02E 10/563* (2013.01)

(58) Field of Classification Search
CPC .. H02J 3/383; H02J 3/386; H02J 3/42; H02M 7/44; Y02E 10/563
(Continued)

(56) References Cited

U.S. PATENT DOCUMENTS

| 2003/0039132 A1 | 2/2003 | Engler |
| 2008/0084070 A1* | 4/2008 | Teichmann ............... H02J 3/38 290/55 |

(Continued)

FOREIGN PATENT DOCUMENTS

| DE | 10320087 A1 | 12/2004 |
| EP | 1286444 A2 | 2/2003 |

(Continued)

OTHER PUBLICATIONS

Wei Sun, et al.; "Black Start Capability Assessment in Power System Restoration;" IEEE; 2011; p. 1-7.
(Continued)

*Primary Examiner* — William Hernandez
(74) *Attorney, Agent, or Firm* — Eschweiler & Potashnik, LLC (57) ABSTRACT

In a method for black start of a power station including a plurality of inverters connectable to a local AC electrical grid, a first AC voltage is built up in the AC electrical grid by a first inverter, said first AC voltage being reduced in comparison with a rated voltage of the AC electrical grid by at least a quarter, and at least one second inverter is connected to the AC electrical grid after synchronization with the first AC voltage. After connection of the second converter, a second AC voltage, which is higher than the first AC voltage, is built up in the AC electrical grid.

20 Claims, 4 Drawing Sheets

(58) Field of Classification Search
USPC .......................................................... 307/52
See application file for complete search history.

(56) References Cited

U.S. PATENT DOCUMENTS

| | | | |
|---|---|---|---|
| 2008/0284172 A1* | 11/2008 | Nielsen | F03D 7/026 |
| | | | 290/44 |
| 2010/0127576 A1 | 5/2010 | Ahlborn et al. | |
| 2012/0261917 A1 | 10/2012 | Egedal et al. | |
| 2015/0035366 A1 | 2/2015 | Benesch et al. | |

FOREIGN PATENT DOCUMENTS

| | | |
|---|---|---|
| EP | 1993184 A1 | 11/2008 |
| EP | 2190110 A1 | 5/2010 |
| EP | 2632012 A1 | 8/2013 |
| WO | 2004099604 A2 | 11/2004 |
| WO | 2011058170 A1 | 5/2011 |

OTHER PUBLICATIONS

Niannian Cal, et al; "A Hierarchical Multi-Agent Control Scheme for a Black Start-Capable Microgrid;" IEEE; 2011; p. 1-7.

* cited by examiner

METHOD FOR BLACK STARTING A POWER STATION COMPRISING A PLURALITY OF INVERTERS CONNECTABLE TO AN AC ELECTRICAL GRID

CROSS REFERENCE TO RELATED APPLICATIONS

This application claims priority to International Patent Application number PCT/EP2014/055109, filed on Mar. 14, 2014, which claims priority to German Patent Application number 10 2013 102 603.6, filed on Mar. 14, 2013, and is hereby incorporated by reference in its entirety.

FIELD

The disclosure relates to a method for black-starting a power station comprising a plurality of inverters connectable to a local AC grid. Furthermore, the disclosure relates to a power station comprising a plurality of inverters connectable to a local AC grid and a superordinate control unit, which implements such a method for black-starting.

BACKGROUND

A black start is understood to mean that a power station is run up without any external energy supply. This is to say that there is no electrical energy available externally, for example for maintaining a local AC grid of the power station. A cause of this may be that an external AC grid to which the local AC grid is connected via a transformer, for example, has collapsed or that no energy can be drawn from such an external AC grid or that no external AC grid is present at all because the local AC grid is an island.

The term AC grid in this case primarily refers to the physical device comprising electrical connections, links, i.e. lines, and the like, but not to the AC voltage present at this device or provided by this device. A local AC grid is in this case understood to mean a limited AC grid. This may be an internal AC grid of a power station as long as the latter is disconnected from an external AC grid, but can also be a so-called island. The island may be either an autonomous island without any connection to an external AC grid or can equally also be a physically limited grid section which is disconnectable from a superordinate AC grid as long as said grid section is disconnected from the superordinate (external) AC grid. Often, the local AC grid does not comprise any additional loads which are not associated with the operation of the local AC grid, however, or these loads are switched off or disconnected during the black start.

The inverters of the power station which are connectable to the local AC grid are those with which electrical energy can be fed into the AC grid. In principle, these may also be bidirectional inverters with which electrical energy can also be drawn from the AC grid in order to be buffer-stored in a battery, for example.

In particular, the electrical energy which is fed by the inverters into the local AC grid originates from renewable energy sources such as wind turbines or generators and/or photovoltaic generators connected thereto, for example.

The term power station here means nothing more than the plurality of inverters which are connected to energy sources and with which electrical energy can be fed into the local AC grid. This may be a power station in the narrower meaning, for example a wind farm or a photovoltaic farm. The term power station also includes any other energy generation units having a plurality of inverters which are connected to any local AC grid, for example, to a grid section connected disconnectably to a superordinate AC grid, however.

During black-starting of a power station using a multiplicity of inverters connectable to a local AC grid, one problem is that the internal consumption of the local AC grid owing to transformer losses, cabling impedances, etc. which needs to be raised by the power station itself goes beyond the electrical energy which can be provided reliably by a single inverter. However, it would be very difficult to connect a plurality of inverters to the local AC grid at the same time, in particular as long as there is still no AC voltage present in the local AC grid.

DE 103 20 087 A1 discloses a method for operating a wind farm and a wind farm comprising a central apparatus for controlling the wind farm. In order to make the wind farm capable of a black start, said wind farm comprises a permanently excited wind turbine with motorless wind direction tracking. This permanently excited wind turbine can also be run up when no energy can be drawn externally. With the aid of the electrical energy from the permanently excited wind turbine, first at least one first wind turbine is run up which is not permanently excited and which is tracked in terms of the wind direction by a motor. This wind turbine builds up a rated frequency and rated voltage of a local AC grid again via a self-commutated inverter, with the wind turbines of the wind farm being connected to said local AC grid. The remaining wind turbines can be synchronized with the AC voltage in the local AC grid and can begin with the feed of power. This may be reactive power and/or real power. The remaining wind turbines can in this case cover the initial energy demand via the local AC grid. A precondition for the implementability of this known method is that the wind farm comprises a particular permanently excited wind turbine with motorless wind direction tracking and that the first wind turbine which is not permanently excited, with which the local AC grid is built up, provides sufficient electrical energy to cover the internal consumption of the local AC grid.

EP 1 993 184 A1 discloses a method for black-starting a wind farm and a wind farm, in which the internal consumption of a local AC grid is initially covered by a local energy source in the form of a large battery, an uninterruptible power supply or a generator, such as a diesel generator or a fuel cell, for example. The energy provided by this local energy source via the local AC grid is used to firstly start at least one first wind turbine. Then, successive further wind turbines are run up with the increasing energy available. In this case, the local power source must build up the local AC grid to which the individual wind turbines are connected and correspondingly cover the entire internal consumption of this grid. Furthermore, it needs to provide the electric power required for running up the first wind turbine. Correspondingly, this local power source which needs to be provided additionally must have large dimensions.

US 2012/0261917 A1 discloses a method for black-starting wind turbines, in which a diesel generator applies a preset AC voltage to the output of a wind turbine in order to imitate a rated AC voltage of a running local network. In this case, the real power and reactive power to be generated by the wind turbines on provision of the rated voltage is initially set to zero in order to enable connection without any sudden changes. The connection takes place stepwise wind turbine by wind turbine. In this case too, the diesel generator needs to be capable of covering the internal consumption of the local AC grid to which the wind turbines are connected.

Initial coverage of the internal consumption during a black start of a wind farm comprising a plurality of wind turbines comprising an energy store and subsequent stepwise connection of the wind turbines are also known from WO 2011/058170 A1.

In order to coordinate the operation of a plurality of voltage-setting inverters connected in parallel to an AC grid, i.e. of inverters which build up a preset voltage without direct communication between the inverters, the use of so-called frequency and voltage droops is known from EP 1 286 444 B1. The term frequency droop is in this case used to refer to a frequency/real power characteristic stored in the inverters which is used for controlling the frequency of the AC voltage output by the inverters depending on the real power output by the inverters: during voltage-setting operation of the inverters, the real power results from the present impedance. Depending on the output real power and stored frequency droop, the inverters set their frequency. The term "voltage droop", on the other hand, is used to denote a voltage/reactive power characteristic stored in the inverters which is used for controlling the level or amplitude of the AC voltage output by the inverters depending on the reactive power output by the inverters: during voltage-setting operation of the inverters, the reactive power also results from the present impedance. In response to the output reactive power, the inverters set a voltage amplitude, which is corrected in relation to a reference value for the voltage setting, taking into consideration the stored voltage droop at the output.

In the case of current-setting inverters, i.e. inverters which output a preset current, the frequency droop likewise indicates the relationship between the output real power P and the frequency f of the AC voltage present at the output of the inverter. The voltage droop is correspondingly the relationship between the reactive power Q output by the inverter and the AC voltage present at its output. "AC voltage present at the output" is intended here and generally in this application to mean the magnitude of this AC voltage. The coordination of the operation of a plurality of current-setting inverters connected in parallel to an AC grid can also take place using frequency and voltage droops. Coordination of the operation with the aid of frequency and voltage droops is possible even in mixed groups of voltage-setting and current-setting inverters.

The document EP 2 632 012 A1 published after the priority date of the present patent application is concerned with the requirement that, in the case of a black start of a decentralized electrical energy supply grid, all of the connected grid formers find a common working point for building up a stable mains voltage. The operation of the grid formers in this case takes place with the aid of droop characteristics which compare an electric power called up by the electrical energy supply grid with the mains voltage. Each grid former determines, with the aid of its droop characteristics, its present voltage to be fed. A working point between a plurality of grid formers which is matched to one another in an electrical energy supply grid is achieved if all of the grid formers output an identical voltage to be fed. According to EP 2 632 012 A1, it would be most favorable to allow first a single grid former to preset the mains voltage and then to connect the remaining grid formers to the electrical energy supply grid. Islands are characterized by a low hierarchy, however. The grid formers can in this case only be connected jointly to the consumer loads. Owing to the connected consumers, the consumer load present during the black start can be too great for these individual grid formers, however, to generate the mains voltage. Therefore, the black start takes place with at least two coordinated grid formers together. This coordination could take place asynchronously, wherein each of the grid formers to be coordinated calculates the voltage to be fed into the grid on the basis of their dedicated power fed into the electrical energy supply grid via the droop characteristic. However, this is opposed by the knowledge that a common mains voltage cannot be set asynchronously if one of the coordinated grid formers cannot follow the other grid formers quickly enough on its droop characteristic because it has, for example, a current limit which it cannot exceed. This problem could be solved synchronously according to EP 2 632 012 A1 by virtue of a common master firmly presetting the setpoint values for the mains voltage. In this way, it will be possible to avoid a situation whereby excessively high currents are demanded of the grid formers owing to low temporary mains voltages. However, each individual grid former would need to be connected to the master, which can result in considerable costs, a high degree of susceptibility to faults and therefore to insufficient availability, precisely in the case of grid formers distributed physically over several kilometers.

In contrast, one concept of EP 2 632 012 A1 consists in moving the grid former stopped on its droop characteristic and to virtually give a thrust so that it can move on its droop characteristic again. This is achieved by virtue of the fact that, when the grid former has stopped on its droop characteristic, it is shifted onto a new point on the droop characteristic, from which it needs to output a current below its current limit for the power to be output. Thus, it can increase its power to be output to the electrical energy supply grid by means of the output current which is now variable again and can move freely on the droop characteristic. Therefore, EP 2 632 012 A1 discloses a method for synchronizing a feed-in voltage with a mains voltage of an electrical energy supply grid, wherein a property of the feed-in voltage is determinable on the basis of a droop characteristic, wherein the droop characteristic compares the property of the feed-in voltage with a feed-in power, wherein the feed-in power is consumed by the electrical energy supply grid when the feed-in voltage is applied, and wherein the property of the feed-in voltage is matched to a specific value when a limit for the feed-in power is reached. The properties of the feed-in voltage or the mains voltage are, for example, the frequency, phase angle and/or the rms value of the corresponding voltage. In the case of a black start of the energy supply grid, all of the grid formers involved are started synchronously by a switch-on signal and synchronized with one another via the electrical energy supply grid. In this case, it is sufficient if a master is connected to one of the grid formers, which master gives the start signal to said grid former. Even if, in accordance with EP 2 632 012 A1, it is intended to be possible for all of the grid formers to have an inverter as energy generation unit, which inverter is designed to convert electrical energy from a DC voltage source into a feed-in voltage, the grid former started by the master is specifically a diesel generator, which generates an initial voltage rise in the form of a voltage ramp. All of the other grid formers measure the voltage rise in order to become involved in the black start of the electrical energy supply grid, and the voltage rise is in this case used for starting the electrical power output of inverters which are connected as grid formers to the energy supply grid.

EP 2 190 110 B1 discloses a method for determining the loading capacity of a DC voltage source which is connectable to an AC grid with a preset line frequency via an inverter and a mains switch. In this method, a DC input voltage of the inverter, which may be the output voltage of the DC voltage source or a voltage in a DC link of the inverter, is detected when the mains switch is open and when there is actuation of the inverter which enables a four-quadrant operating mode. The inverter is actuated in such a way that it inverts the DC input voltage to a test frequency deviating from the line frequency. Deviating in this context means that the test frequency can be both lower and higher than the line frequency. It will often be higher than the line frequency. Given suitable selection of the test frequency in respect of the respective inverter and its use environment, a test load acting on the DC voltage source can thus be considerably increased above the internal consumption of the inverter at the line frequency. Specifically, it can be brought to a level which corresponds to the loading of the DC voltage source when said DC voltage source is connected to the grid, so that grid connection firstly takes place as early as possible, but secondly without any risk of renewed grid disconnection.

SUMMARY

The disclosure is based on a problem of specifying a method for black-starting a power station comprising a plurality of inverters connectable to a local AC grid which can be implemented without any investment in special energy sources for the supply during black-starting. Furthermore, a power station comprising a plurality of inverters connectable to a local AC grid and a superordinate control unit for implementing such a method is specified.

In a method according to one embodiment of the disclosure for black-starting a power station comprising a plurality of inverters connectable to a local AC grid an AC voltage is built up in the AC grid by a first inverter, and at least one second inverter is connected, after synchronization with the AC voltage, to the AC grid, wherein the first AC voltage built up by the first inverter is reduced by at least a quarter, for example, at least half with respect to a rated voltage of the AC grid. Once the second inverter has been connected, a second AC voltage, which is increased with respect to the first AC voltage, is built up in the AC grid.

By virtue of the first AC voltage, which in one embodiment is built up purely by the first inverter in the AC grid, being reduced by a significant amount of at least one quarter with respect to the rated voltage of the AC grid, i.e. the first AC voltage is at most 75% of the rated voltage, the internal consumption of the AC grid, which is primarily dependent on the line capacitances of the cabling and therefore is proportional to the square of the AC voltage in the AC grid, is reduced to no more than 56.25% of its value given the rated voltage. At the same time, the capacity of the first inverter, which is linearly dependent on the AC voltage in the AC grid when the rated current remains the same, at the first AC voltage is reduced only to 75% of the corresponding value for the rated voltage. Compared to a direct buildup of the rated voltage of the AC grid, the first inverter is therefore in any case loaded to three quarters based on its capacity in the method according to the disclosure. When the first AC voltage is ½ or even only ⅕ of the rated voltage of the AC grid, for example, the internal consumption is reduced to ¼ or ¹⁄₂₅ and therefore the loading related to the capacity of the first inverter is reduced to ½ or ⅕. At least ⅕ of the internal consumption of the local AC grid is generally even much less than the first inverter in any case provides as one of many during normal operation of the power station. In any case, owing to the reduction in the first AC voltage in comparison with the rated voltage of the AC grid, the loading related to the capacity of the first inverter can be reduced in a simple manner during buildup of the first AC voltage in comparison with the internal consumption of the AC grid, which is likewise based on the capacity of the first inverter, at the rated voltage of said AC grid to such an extent that the first inverter can withstand this loading without any problems. This also applies in particular when the corresponding inverter is not specifically designed for a black start, specifically a renewed runup of the AC grid from a voltage of zero.

In a method according to one embodiment of the disclosure, the buildup of the AC voltage in the AC grid takes place in at least two discrete stages. Even in the first stage, an inverter builds up the first AC voltage by means of the first inverter, which would not be suitable per se for managing the black start, in contrast to a diesel generator, for example, owing to current limitation provided in the inverter. After these first and possibly subsequent stages, a precisely coordinated connection of the further inverters and a likewise precisely coordinated buildup of the next AC voltage take place with all of the inverters then connected. For this purpose, a corresponding flow chart for the black start is stored in all inverters involved; in one embodiment the black start is coordinated by a common master of all of the inverters, however. The common master acts as superordinate control unit of the inverters and is referred to as a farm controller in the case of a photovoltaic (PV) or wind farm. For the case of an island comprising a plurality of energy generation units, for example, a physically limited grid section which is connected disconnectably to a superordinate AC grid, the superordinate control unit is referred to as an island controller.

The second AC voltage can be 1.2 to 3 times, in one embodiment 2 times the first AC voltage in a method according to the disclosure. At 2 times the voltage, the absolute load applied to the first inverter and the second inverter during buildup of the second AC voltage is four times as great as the absolute load applied to the first inverter alone during buildup of the first AC voltage. However, this absolute load which is four times as great is distributed, advantageously in equal parts, among two inverters, which in addition each have twice the capacity in the case of the second AC voltage, which is twice as high as the first AC voltage. The relative load or loading related to the capacity of the inverters therefore does not increase during buildup of a second AC voltage, which is twice as great at the first AC voltage.

The second AC voltage is typically even more markedly less than the rated voltage of the AC grid, i.e. by at least by 0.2 times, often 0.5 times the first AC voltage. In most cases, it remains behind the rated voltage by at least 1 times the first AC voltage.

Thus, in the method according to one embodiment of the disclosure, a third inverter, after synchronization with the second AC voltage, can be connected to the AC grid and, once the third inverter has been connected, a third AC voltage which is increased with respect to the second AC voltage can be built up in the AC grid. This third AC voltage can also be less than the rated voltage of the AC grid by at least 0.2 times or 0.5 times the first AC voltage, with the result that the total rated voltage is only built up in a subsequent step by four or more inverters.

In this case, a difference between successively built-up AC voltages can in each case be 0.2 or 0.5 to 2 times the first AC voltage. In one embodiment the difference between successively built-up AC voltages is always the same and precisely the same as the first AC voltage.

The number of inverters by means of which the rated voltage is built up stepwise is typically dependent on the size of the respective power station, i.e. the number of inverters. In this embodiment, both sequential connection of individual inverters is possible in such a way that precisely one further inverter is brought into operation in each stage. Likewise, sequential connection of the inverters is possible in such a way that, once the first inverter has been brought into operation, i.e. from the second stage, in each case one group of a plurality of inverters is connected to the local AC grid within one stage. In this embodiment, however, attention should be paid to the fact that the compensation currents which increase as the number of inverters simultaneously to be connected increases do not exceed a preset maximum value. For this purpose, the inverters to be connected within one stage can also be connected to the AC grid shortly one after the other, with the result that the individual compensation currents do not occur simultaneously and are not superimposed. Thus, it is firstly desirable to implement the black start of the power station as quickly as possible, and thus in as few successive stages as possible. On the other hand, however, care needs to be taken to ensure that the inverters connected to the local AC grid are never loaded, throughout the entire duration of the black start, at the boundary of their capacity, which is dependent on the AC voltage present at that time. In one embodiment, a sufficient control reserve of at least 20% between a present output power of the inverter and its capacity on the respective AC voltage should always be provided. This ensures the existence of a control range in order to be able to respond to unpredicted events during the black start, for example the power dip of an individual inverter. In general, the number of stages is between three and ten. Usually, it is between four and six. Often, five stages are appropriate.

In order to avoid high compensation currents, in one embodiment each inverter is connected powerlessly to the AC grid as far as possible. In order to achieve this, a voltage droop and a frequency droop of the respective inverter can be shifted such that, on connection, ideally no power flows into the AC grid. In reality, certain compensation currents directly after the connection, and associated power flow, owing to ever present tolerances in the synchronization of the inverters with respect to the local AC voltage cannot be completely avoided. Owing to an optimized shift in the frequency droop and voltage droop, however, these compensation currents can be reduced to a harmless amount. This can take place while maintaining a frequency droop of the already connected inverter and a corresponding reduction in the frequency droop of the inverter to be connected.

Powerlessly connecting the respective inverter can also be achieved, however, by virtue of only a shift in the voltage droop, but not in the frequency droop, being performed in the case of the inverter to be connected. The frequency droop can maintain its initial characteristic during connection. In this embodiment, both droops are shifted in the case of the already connected inverters prior to the connection of the further inverter, wherein the frequency droops of the already connected inverters are increased. During connection of the first inverter to the AC grid, the position of its frequency droop is not critical since, in the case of only one inverter, on the local AC grid, no load distribution is effected by the frequency droop. In particular, after the powerless connection of the first inverter, measures for distributing the load among all of the inverters connected to the AC grid do not need to be taken, as is expedient after connection of each further inverter. However, the first inverter can, once connected, build up the first AC voltage in the AC grid beginning with the rated frequency of the AC grid. The connection of the first inverter takes place at an output voltage of zero or close to zero. By increasing the voltage droop, the output voltage of the inverter is increased to the first AC voltage.

In order to distribute the load among all of the inverters connected to the AC grid after connection of the second inverter and all of the further inverters, a frequency droop and a voltage droop of the most recently connected inverter and the frequency droops and voltage droops of all of the inverters which have already previously been connected can be matched to one another. The matching of the frequency droops and voltage droops, which can be an adjustment of these droops in the case of identical inverters, results in the internal consumption of the AC grid given the respective AC voltage being applied uniformly, in particular equally, to all of the inverters. However, it is also possible for the division of the load to be performed taking into consideration an individually different nominal power of the individual inverters. In this case, the load is not distributed uniformly among the inverters, but an inverter with a higher nominal power takes on a slightly greater load proportion than the remaining inverters with a correspondingly lower nominal power.

Once the load has been distributed among all of the inverters, in order to build up the next AC voltage, voltage droops of all of the inverters connected to the AC grid can be increased in parallel. If only the first inverter is connected to the AC grid, correspondingly only its voltage droop is increased.

Owing to the internal consumption of the AC grid which increases as the AC voltage in the AC grid increases, the frequency of the AC voltage in the AC grid decreases. This can be increased again to the rated frequency of the AC grid once the AC voltage has been built up by increasing the frequency droops of all of the inverters connected to the AC grid. This step is, in one embodiment, also implemented by the first inverter when the first inverter on its own builds up the first AC voltage in the AC grid.

Alternatively, it is also possible for it not to be the frequency droop of the already connected inverters but rather the frequency droop of the inverters to be connected in the next step that is shifted. In this way too, powerless connection of the inverters to be connected to the local AC grid can be realized. Once connection has taken place, the frequency droops and voltage droops of all of the inverters connected to the AC grid are also adjusted in this case, and therefore the total internal consumption in the case of the respective AC voltage is distributed uniformly among the presently connected inverters.

The inverters connected to the AC grid in the second and following stages of the method according to the disclosure have until now assumed to be voltage-setting inverters in the description of the disclosure. It is also desirable in one embodiment if the inverters are all operated in voltage-setting fashion, at least during the black start. However, only the first inverter necessarily needs to enable voltage-setting operation. The further inverters may at least partially also be inverters with a current-setting operation. Current-setting inverters can be run up from an output current of zero to a fixed current which they then maintain after powerless connection to the AC grid, for example. The load taken up by the inverters then increases as the AC voltage in the AC grid increases stepwise. With this procedure, which corresponds to a constantly horizontal power/frequency characteristic of the current-setting inverters, the current-setting inverters do not contribute to the grid regulation in the AC grid. Such a contribution is likewise realizable, however, by suitable matching of all of the voltage and frequency droops. Advantageously, in the case of a hybrid operating mode during the black start, i.e. a simultaneous operation of the voltage-setting and current-setting inverters, the control reserve of the voltage-setting inverters to be stored is much greater than at least 20%, and is advantageously at least 50%. This results from the fact that, in the case of an increase in the AC voltage, a large proportion of the load needs to be accommodated initially by the voltage-setting inverters, while the current-setting inverters only respond on the basis of the frequency which is output by the voltage-setting inverters.

In order to avoid any lack of clarity, it will be stated as follows: in principle voltage-setting inverters are required for grid formation. Typical generator characteristics f(P) or u(Q) are impressed on the inverters by their controller. They each act in the AC grid as a voltage source, whose output powers result from the impedance connected to its output. The real power output of voltage-setting inverters does have, however, an influence on the AC voltage at the output, similarly to as in the case of a generator. The more real power is output, the lower the frequency of the AC voltage becomes. The same applies to the reactive power: the voltage amplitude of the AC voltage at the output of the voltage-setting inverters is dependent on the output reactive power. Therefore, a behavior of the inverter which is equivalent to that of an electric machine in the form of a generator is therefore achieved with the aid of the generator characteristics f(P) and u(Q).

Current-setting inverters operate in grid-assisting fashion when P(f) and Q(u) characteristics are stored in the inverters. This means that the real power provided at the output of the AC voltage is dependent on the line frequency. If this line frequency is high, i.e. if there is too much power in the AC grid, the grid-assisting current-setting inverters feed in less real power than at a low line frequency, which is an indication of too little power in the AC grid. With this behavior, the inverters counteract a power surplus or a lack of power on the grid, i.e. they assist the AC grid. Similarly, the Q(u) characteristic ensures a reactive power output of the inverter depending on the amplitude of the AC voltage at the connection point of the inverter in the AC grid.

In addition, inverters which feed in independently of the present grid state can also be provided. These are likewise current-setting inverters. However, these inverters generally feed their maximum possible power into the AC grid, irrespective of the state of the AC grid. The power is limited at the top only, as is also the case in all other inverters, by the supply of primary energy (for example of incoming radiation power onto the modules of a connected photovoltaic generator) or owing to a device-specific current-carrying capacity.

The two last-mentioned types of current-setting inverters can contribute to the black start according to the method according to one embodiment of the disclosure and provide electric power for assisting the grid formers. The grid formers, i.e. the voltage-setting inverters alone, or the characteristics f(P) and u(Q) stored therein determine the properties of the AC voltage on the local AC grid, however. Since the profile of the characteristics in one embodiment is controlled via the farm controller or the superordinate control unit, the farm controller or the superordinate control unit therefore determines the AC voltage on the local AC grid.

In the method according to one embodiment of the disclosure, the AC voltage built up by the first inverter in the AC grid can deviate from the rated values of the AC grid not only with respect to its amplitude, but also with respect to its frequency. In particular, it can have a frequency which deviates from a rated frequency of the AC grid by at least 10%. Depending on the prevalence of capacitive or inductive loads in the AC grid, a lower or higher frequency of the first AC voltage in comparison with the rated frequency of the AC grid needs to be selected in order to facilitate the black start. In the case of a lower frequency and capacitive loads, the consumption of reactive power by the capacitive loads is reduced. There is a converse behavior with inductive loads. The second AC voltage built up in the AC grid after connection of the second inverter can then have a frequency which is closer to the rated frequency of the AC grid.

This concept of the reduced power consumption by the AC grid during black starting owing to the buildup of an AC voltage with a frequency which initially deviates from the rated frequency of the AC grid can be used not only in addition to, but also as an alternative to, the concept of the buildup of an AC voltage with an initially reduced rms value in comparison with the rated value of the AC grid. That is to say that, specifically, the first AC voltage built up by the first inverter can already reach the rated voltage of the AC grid, but can have a frequency which deviates from the rated frequency of the AC grid by at least 10%. After connection of the second inverter, a second AC voltage can then be built up from the rated voltage of the AC grid, which second AC voltage has a frequency which is closer to the rated frequency of the AC grid.

This method can also be implemented in more than two stages. In this case, the frequencies of two successively built-up AC voltages can differ from one another by at least 10% of the frequency which is already closer to the rated frequency of the AC grid. In one embodiment, in the case of black-starting in a few stages, this difference can also be at least 25% or at least 50%, in specific cases even at least 75%. A sensible upper limit for this difference is 85%.

All of the measures described in relation to this second method according to one embodiment of the disclosure for black-starting a power station can also be used in the first method according to the disclosure. Conversely, any measure which has been described above in connection with the first method according to the disclosure can also be used for the second method according to the disclosure without the first rated voltage built up in the AC grid needing to have an rms value which is reduced in comparison with the rated voltage of the AC grid if the abovementioned measures do not necessarily require an AC voltage which is also reduced with respect to its rms value.

In the case of a power station according to the disclosure comprising a plurality of inverters connectable to a local AC grid, a superordinate control unit is provided, which connects the inverters to the AC grid in accordance with one of the above-described methods according to the disclosure during black-starting. The superordinate control unit in this case also determines which inverter is the first inverter, which builds up the first AC voltage in the local AC grid and which inverters are connected to the AC grid thereafter and in what order. In addition, it can be the superordinate control unit that shifts the voltage and frequency droops of the individual inverters in accordance with the disclosure. As soon as the rated voltage has been reached in the local AC grid, it is also possible for the further inverters to be connected to the local AC grid automatically, i.e. without coordination by the superordinate control unit. However, with the aim of keeping the compensation currents which can never be entirely avoided during connection within a reasonable range, it is advantageous to implement the connection in a coordinated manner in this case too, for example by a connection order stored immanently in the inverters or else via the superordinate control unit.

The superordinate control unit can undergo its energy supply directly from one or more DC sources connected to the inverters on the input side. For times in which no energy is available externally, it can also have a dedicated energy supply, for example on the basis of a battery.

The DC sources connected to the inverters can in particular be photovoltaic generators, which in principle can generate electrical energy without any initial supply of energy externally. In principle, the method according to the disclosure can also be transferred to a wind farm comprising a plurality of wind turbines, however. In this case too, the method is appropriate if the internal consumption of the wind farm at the rated voltage cannot be provided by a single inverter connected to a wind turbine.

Advantageous developments of the disclosure are set forth in the patent claims, the description and the drawings. The advantages mentioned in the description of features and of combinations of a plurality of features are merely by way of example and can be used alternatively or cumulatively without the advantages necessarily of embodiments according to the disclosure needing to be achieved. Without the subject matter of the attached patent claims being changed hereby, the following applies as regards the disclosure content of the original application documents and the patent: further features can be gleaned from the drawings. The combination of features of different embodiments of the disclosure or of features of different patent claims is likewise possible as a deviation from the selected back-references in the patent claims and is hereby suggested. This also relates to those features which are illustrated in separate drawings or are mentioned in the description thereof. These features can also be combined with features from different patent claims. Likewise, features mentioned in the patent claims can be dispensed with for further embodiments of the disclosure.

The features mentioned in the patent claims and the description should be understood with respect to their number such that precisely this number or a greater number than the mentioned number is provided, without explicit use of the adverb "at least" being required. If, therefore, "an" or "one" element is discussed, for example, this should be understood as meaning that precisely one element, two elements or more elements are provided. This also applies in the case when, for example, "a first" or "a second" or else "a further" element is discussed. In this case too, precisely one, two or more first, second or further elements can be provided.

These explicitly mentioned features can be supplemented by other features or can be the only features which the respective method or the respective power station has.

The reference symbols contained in the patent claims do not represent any restriction to the scope of the subjects protected by the patent claims. They merely serve the purpose of making the patent claims more easily understandable.

BRIEF DESCRIPTION OF THE DRAWINGS

The disclosure will be explained and described in more detail below with reference to the attached drawings on the basis of exemplary embodiments.

DETAILED DESCRIPTION

Figure 1:
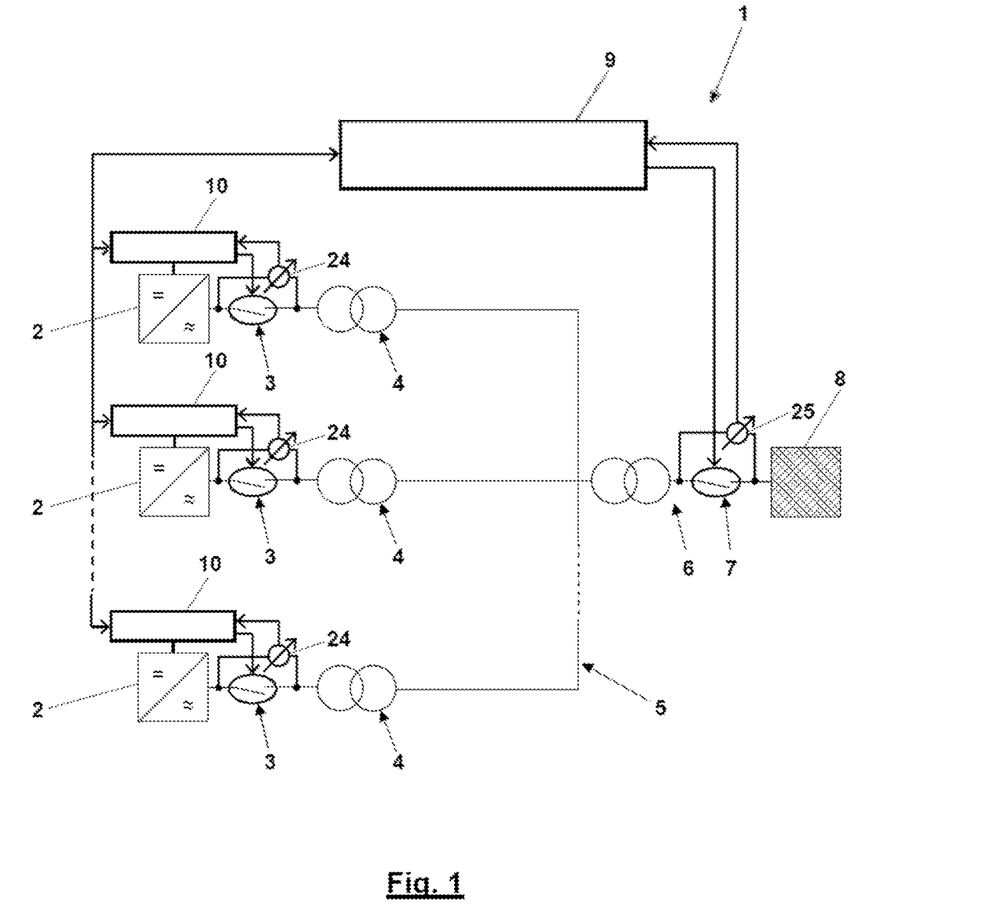
FIG. 1 shows a basic circuit diagram of a power station comprising a plurality of inverters and a farm controller.

The power station 1 illustrated in FIG. 1 comprises a plurality of inverters 2, of which three are illustrated in this embodiment. The number of inverters 2 can be much greater, however, and can be 42, for example. The inverters 2 are connectable to a local AC grid 5 via mains switches 3 and transformers 4. The local AC grid 5 in turn is connectable to an external AC grid 8 via a main transformer 6 and a primary mains switch 7 as grid tie point. The connection via the primary mains switch 7 takes place by means of a farm controller 9 as a superordinate control unit. The farm controller 9 additionally communicates with controllers 10 of the individual inverters, which is illustrated by arrowed connecting lines. For the synchronization of the output voltage of the inverters 2 to be connected with the AC voltage present in the local AC grid 5, or at the locations of the mains switches 3, in each case voltmeters 24 are provided. The voltmeters 24 detect a voltage difference between two sides of the respective mains switch 3 and communicate this voltage difference to the corresponding controllers 10 of the inverters 2. Furthermore, the voltmeters 24 are designed to detect frequency and phase differences which may be present between the two sides of the respective mains switch 3 and to communicate these frequency and phase differences to the controllers 10 of the inverters. The controllers 10 control the operation of the inverters 2 in principle depending on the AC voltage present at the output of the inverters 2. This is the AC voltage in the local AC grid 5 converted by the transformation ratio of the respective transformer 4. On the input side, DC sources are connected to the inverters 2, which DC sources may in particular be photovoltaic generators and are not illustrated in FIG. 1. The AC grid 5, wherein this term in this case in particular means the wiring system which connects the individual inverters to one another and to the primary mains switch 7 and the transformers 4 and 6, typically has long line lengths. This results in high line capacitances and correspondingly in a high internal consumption of the AC grid 5 of electric power based on the rated power of an individual inverter 2. This internal consumption of electric power increases quadratically with the AC voltage in the AC grid 5 because it is based substantially on the line capacitances. The method according to one embodiment of the disclosure makes use of this during connection of the individual inverters 2 to the local AC grid 5 during a so-called black start in order not to overload the inverter 2 which is connected first to the AC grid 5 by means of the internal consumption of the AC grid 5.

Figure 2:
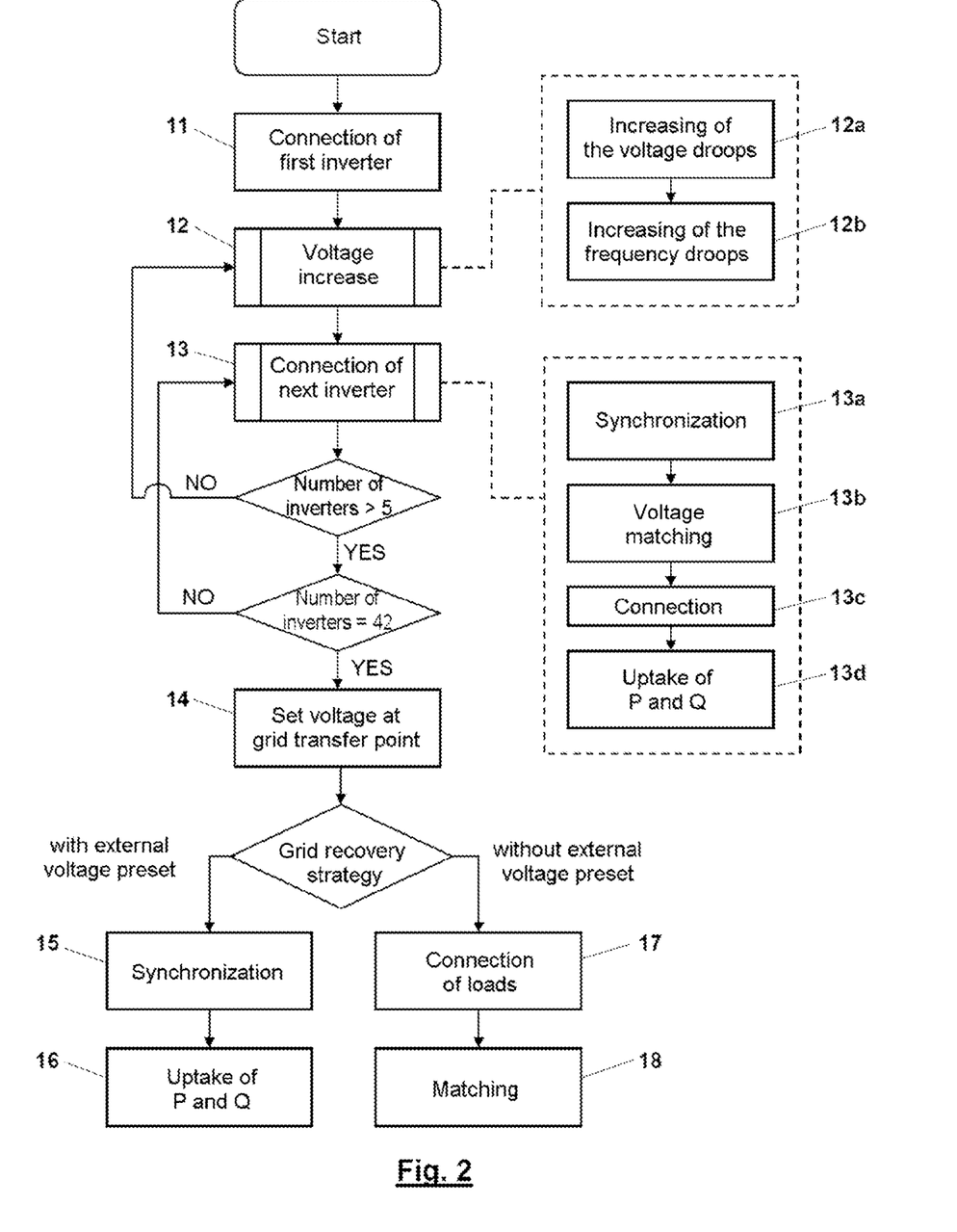
FIG. 2 shows a flowchart illustrating the sequence of a method according to one embodiment of the disclosure for black-starting the power station shown in FIG. 1.

The method sketched in FIG. 2 in the form of a flowchart for connecting the inverters 2 to the local AC grid 5 shown in FIG. 1 during a so-called black start, i.e. without any supply of electrical energy from the external AC grid 8, begins after starting with an act 11, in which a first inverter 2 is first connected powerlessly to the AC grid 5. Since the voltage in the AC grid 5 is zero, this means that the inverter does not initially output any voltage either. In a subsequent act 12, the voltage is then increased. This takes place in such a way that, in a subact 12a, the voltage droops of all of the inverters 2 connected to the AC grid 5 are increased. In this way, the output voltage of the connected inverters 2 increases and thus also the level of the AC voltage in the AC grid 5 increases, with the result that, in the case of the reactive load present on the AC grid 5, a preset AC voltage is achieved. In this case, the voltage droop is a voltage/reactive power characteristic u(Q) illustrated in FIG. 3(b), where u is the AC voltage at the output of the respective inverter 2, and Q is the reactive power output by the inverter. The first inverter 2 connected to the AC grid 5 is not used in act 12a to attempt to achieve directly the rated voltage of the AC grid 5. Instead, a much reduced first AC voltage is set, which in this case is only ⅕ of the rated voltage, by way of example.

Figure 3:
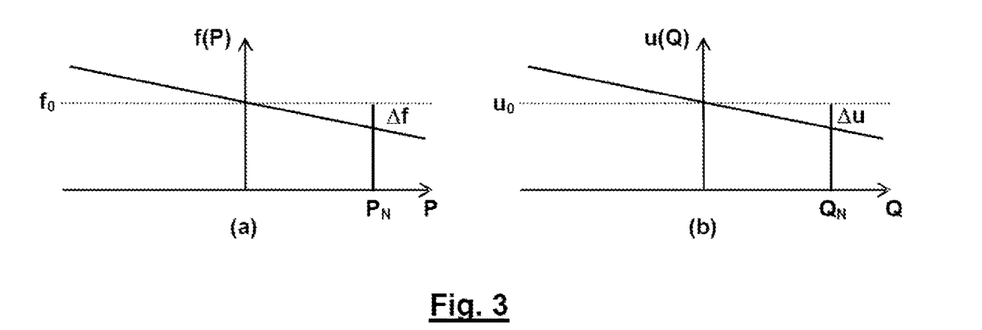
FIG. 3 shows frequency and voltage droops used in the method according to one embodiment of the disclosure of the inverters of the power station.

A frequency droop illustrated in FIG. 3(a), i.e. a frequency/real power characteristic f(P), which is stored in addition to the voltage droop shown in FIG. 3(b) in each inverter 2, is adjusted during connection of the first inverter 2 to the AC grid 5 in such a way that the AC voltage provided by the inverter 2 has the rated frequency $f_0$ of the AC grid 5 given a real power of P=0. By increasing the voltage in subact 12a, the real power P output by the inverter 2 increases, and therefore the frequency f decreases below the rated frequency $f_0$ of the AC grid. This reduction in the frequency f is compensated for in a subact 12b by increasing the frequency droop of the inverters 2 connected to the AC grid 5, in this case initially only the first-connected inverter 2. Thereafter, the first AC voltage, albeit with only ⅕ of the rated voltage, but the rated frequency $f_0$ of the AC grid 5, is present on the AC grid 5.

In the subsequent act 13, a further inverter 2 is connected to the AC grid 5. In a first subact 13a, in addition synchronization of the next inverter 2 with frequency and phase of the AC voltage in the AC grid 5 takes place. In this case, the frequency droop f(P) is adjusted, if appropriate, in such a way that the real power P=0 is output given the actual frequency of the AC voltage in the AC grid. In the next subact 13b, voltage matching takes place in such a way that the inverter to be connected also outputs the reactive power Q=0 given the AC voltage in the AC grid. For this purpose, the voltage droop u(Q) is adjusted correspondingly. This adjustment takes place with the aid of the voltmeters 24, which detect a voltage difference between the contacts of the mains switch 3 for the inverter 2 to be connected in the subsequent act. In order that said inverter also outputs the reactive power Q=0 directly after connection, its voltage droop and therefore its output voltage need to be shifted in such a way that the voltmeter 3a detects the voltage difference 0 at the location of the corresponding mains switch 3 already in the open state of the mains switch 3. In the subsequent subact 13c, the inverter 2 is initially connected powerlessly to the AC grid 5. Only in a subact 13d does the connected inverter 2 take up a proportion of the internal consumption of the AC grid 5 of real power P and reactive power Q. For this purpose, matching of its frequency droop f(P) and its voltage droop u(Q) to the frequency and voltage droops of all of the other inverters 2 already previously connected to the AC grid 5 takes place.

If thereafter the number of inverters 2 connected in total to the AC grid 5 is not yet greater than five, the method returns to act 12 and, in subact 12a, the AC voltage in the AC grid 5 is increased to the next AC voltage, which in this case is higher by ⅕ of the rated voltage of the AC grid 5, by shifting of the voltage droops u(Q) of all of the connected inverters 2. Then, in subact 12b, the frequency of the AC voltage that has been reduced again is increased again to the rated frequency of the AC grid 5 by shifting of the frequency droops f(P) of all of the connected inverters 2.

If, after act 13, the number of inverters connected to the AC grid 5 is five or greater, already the rated voltage of the AC grid 5 has been reached by the proceeding subact 12a. The further inverters 2 can then each be connected by means of step 13 with its subacts 13a to 13d. In this case, the frequency droops of all of the connected inverters then need to be reduced after takeup of power P and reactive power Q in accordance with subact 13d in such a way that the rated frequency of the AC grid is maintained despite the increasing supply of power, without the internal consumption of the AC grid increasing any further. If all of the in this case 42 inverters 2 have been connected, in a subsequent act 14 the voltage at the grid transfer point to the external grid 8 shown in FIG. 1, which in this case is the primary mains switch 7, can be set to the desired rated value there. For this purpose, all of the voltage droops u(Q) and the frequency droops f(P) are correspondingly tracked. This act can be dispensed with if the AC grid 5 is an island, which does not have any connection, or at least does not normally have any connection, to an external AC grid 8.

In the method illustrated in FIG. 2, branching is then provided depending on whether a voltage preset from outside takes place or not. The further grid recovery strategy differs in accordance therewith. In the case of an external voltage preset by the external AC grid 8, synchronization with the AC grid 8 takes place in an act 15 and, in an act 16, after connection of the AC grid 5 to the AC grid 8 via the primary mains switch 7, the takeup of real power P and reactive power Q by the power station 1 takes place. For this purpose too, again the frequency and voltage droops f(P) and u(Q) of the inverters 2 can be matched correspondingly prior to and after connection such that, firstly, connection of the local AC grid 5 to the external AC grid 8 without transfer of real power or reactive power takes place and, secondly, after connection, controlled provision of real power and reactive power by the local AC grid 5 takes place. In order to implement the powerless connection, a voltmeter 25 is provided at the location of the primary mains switch 7 (see FIG. 1). The voltmeter detects a voltage difference between the contacts of the open primary mains switch 7 and communicates this difference to the farm controller 9.

Without any external voltage preset, in an act 17, loads are connected to the AC grid 5 as an island and, in a subsequent act 18, the frequency and voltage droops of the inverters 2 can be tracked in such a way that the rated voltage and the rated frequency in the AC grid 5 are maintained with these loads.

The method illustrated in FIG. 2 is controlled by the farm controller 9 shown in FIG. 1 substantially by action on the controllers 10 of the inverters. If the method has been implemented, the farm controller 9 now only needs to intervene if acts 16 or 18 vary so severely in the case of a change in the external conditions of the AC grid 8 or connection of further loads to the AC grid 5 that matching of the frequency and voltage droops of the inverters 2 is required.

Figure 4:
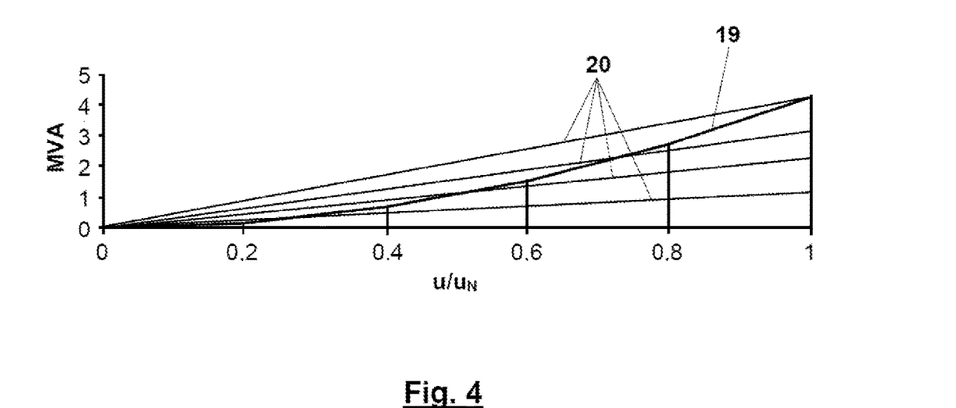
FIG. 4 shows a graph illustrating the internal consumption of a local AC grid and the capacity of inverters of the power station shown in FIG. 1 over an AC voltage in the AC grid.

FIG. 4 shows a graph illustrating the internal consumption of the AC grid 5 for an exemplary power station comprising 42 inverters, which are each connected to photovoltaic generators on the input side. In this case, the internal consumption is plotted over a quotient of the AC voltage u in the AC grid and the rated voltage $u_N$ of the AC grid 5. The internal consumption 19 increases quadratically with the voltage u because it is based substantially on the line capacitances of the AC grid 5. In addition, FIG. 4 shows a graph illustrating capacities 20 of individual inverters 2 over the voltage u, which are linearly dependent on the voltage u given a constant current.

Figure 5:
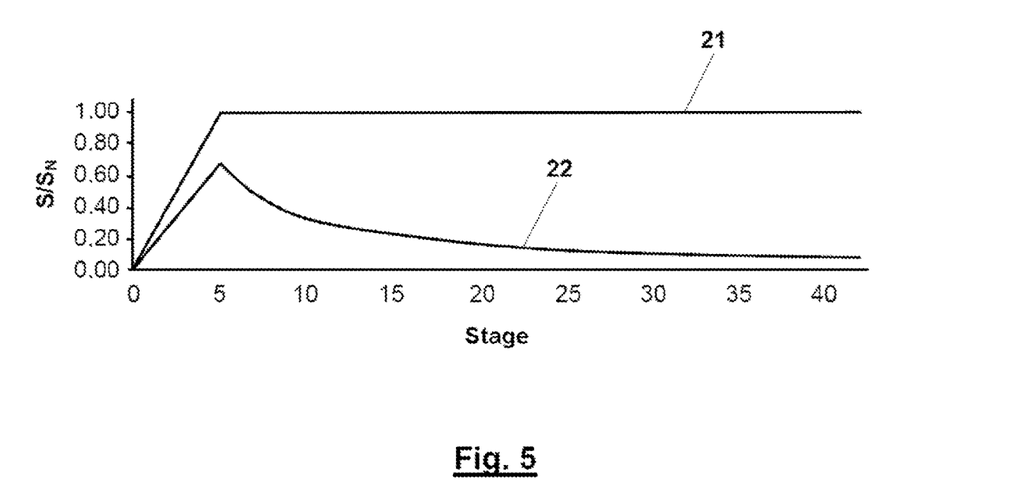
FIG. 5 shows a graph illustrating the apparent power output by the inverter connected first to the local AC grid in the method shown in FIG. 2 and the component of this apparent power used for the internal consumption of the AC grid.

FIG. 5 shows the apparent capacity 21, i.e. the available apparent power of an inverter 2 over the stages of the method illustrated in FIG. 2 during connection of the in total 42 inverters normalized to its apparent capacity $S_N$ given the rated voltage of the AC grid 5. At the same time, that proportion 22 of the internal consumption of the AC grid 5 which is taken up by said inverter is illustrated on the graph. The apparent capacity 21 increases linearly with the increasing AC voltage in the AC grid 5 over the first five stages. At the same time, the proportion 22 of the internal consumption belonging to the inverter 2 also increases linearly because although further inverters are connected over these stages, the internal consumption of the AC grid 5 increases quadratically. Only when more than five inverters are connected does the proportion 22 ultimately fall to 1/42 of the internal consumption of the AC grid 5.

Figure 6:
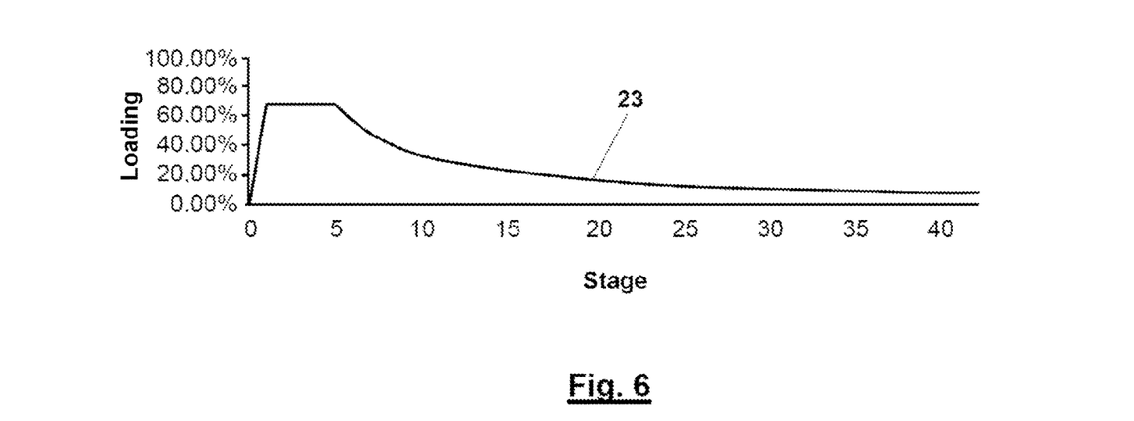
FIG. 6 shows a graph illustrating the load on the inverter connected first to the local AC grid in the method shown in FIG. 2.

FIG. 6 shows a graph illustrating the loading of the first inverter 2 connected to the AC grid 5 over the stages of the method shown in FIG. 2, i.e. the absolute load acting on the inverter based on the inverter's capacity, which increases linearly with the AC voltage in the AC grid 5. The capacity is in this case never exhausted more than to 70%, in order to keep a power reserve. Beyond the first stage of the method, i.e. on connection of the first inverter 2 to the AC grid 5, the loading increases based on the capacity in the case of the first AC voltage. Over the next four stages, the loading remains at a maximum, wherein, at the beginning of each stage, a decrease in the loading, which is not illustrated here, is provided if a further inverter is connected and said inverter then takes up both the real power and the reactive power without the AC voltage in the AC grid 5 and therefore the internal consumption of the AC grid already having been increased to the next stage. In any case, the loading 23 decreases successively after connection of the sixth inverter 2 in stage 6. It only increases again when a load is connected directly to the AC grid 5 or the AC grid 5 is connected to the external AC grid 8 in order to feed in electrical energy.

The invention claimed is:

1. A method for black-starting a power station comprising a plurality of inverters connectable to a local AC grid, comprising:
   building up a first AC voltage in the local AC grid by a first inverter of the plurality of inverters, and
   connecting a second inverter of the plurality of inverters, after synchronization with the first AC voltage, to the local AC grid,
   wherein the first AC voltage built up by the first inverter is reduced by at least a quarter with respect to a rated voltage of the local AC grid, and
   wherein once the second inverter has been connected, a second AC voltage, which is increased with respect to the first AC voltage, is built up in the local AC grid.

2. The method as clamed in claim 1, wherein the second AC voltage is 1.2 to 3 times the first AC voltage.

3. The method as claimed in claim 1, further comprising connecting a third inverter, after synchronization with the second AC voltage to the local AC grid, wherein once the third inverter has been connected, a third AC voltage, which is increased with respect to the second AC voltage, is built up in the local AC grid.

4. The method as claimed in claim 1, wherein a difference between successively built-up AC voltages is 0.2 to 2 times the first AC voltage.

5. The method as claimed in claim 1, wherein a difference between successively built-up AC voltages remains the same.

6. The method as claimed in claim 1, wherein the rated voltage in the local AC grid is built up in 3 to 10 stages.

7. The method as claimed in claim 1, further comprising synchronizing the plurality of inverters with one of the AC voltages and then connecting the plurality of inverters to the local AC grid.

8. The method as claimed in claim 1, wherein each inverter is connected powerlessly to the local AC grid.

9. The method as claimed in claim 8, further comprising shifting a voltage droop and/or a frequency droop of an inverter to be connected in each case and/or of already connected inverters such that, on connection, no power flows into the local AC grid.

10. The method as claimed in claim 1, further comprising, in order to distribute a load among all of the inverters connected to the local AC grid, matching a frequency droop and a voltage droop of a most recently connected inverter to the frequency droops and voltage droops of all of the inverters that have already previously been connected.

11. The method as claimed in claim 1, wherein one of the AC voltages is built up in the local AC grid by the plurality of the inverters connected to the local AC grid up to that point.

12. The method as claimed in claim 11, further comprising, in order to build up the next AC voltage, shifting voltage droops of a plurality of the inverters connected to the local AC grid in a direction of higher voltage values.

13. The method as claimed in claim 1, further comprising, once one of the AC voltages has been built up, shifting frequency droops of a plurality of the inverters connected to the local AC grid in order to achieve a rated frequency of the local AC grid with the respective AC voltage in a direction of higher frequency values.

14. The method as claimed in claim 1, wherein the first AC voltage in the local AC grid is built up by the first inverter beginning at a rated frequency of the local AC grid.

15. The method as claimed in claim 1, wherein:
   the first AC voltage built up by the first inverter in the local AC grid has a frequency which deviates from a rated frequency of the local AC grid by at least 10%, and
   the second AC voltage built up once the second inverter in the local AC grid has been connected has a frequency which is closer to the rated frequency of the local AC grid.

16. A method for black-starting a power station comprising a plurality of inverters connectable to a local AC grid, comprising:
   building up a first AC voltage in the local AC grid by a first inverter of the plurality of inverters, and
   connecting a second inverter of the plurality of inverters, after synchronization with the first AC voltage to the local AC grid,
   wherein the first AC voltage built up by the first inverter has a frequency which deviates from a rated frequency of the local AC grid by at least 10%, and
   wherein once the second inverter has been connected, a second AC voltage, which has a frequency closer to the rated frequency of the local AC grid than the first AC voltage, is built up in the local AC grid.

17. The method as claimed in claim 16, further comprising connecting a third inverter, after synchronization with the second AC voltage, to the local AC grid, wherein once the third inverter has been connected, a third AC voltage is built up in the local AC grid, which has a frequency closer to the rated frequency of the local AC grid than the second AC voltage.

18. The method as claimed in claim 16, wherein the frequencies of two successively built-up AC voltages differ from one another by at least 10% of the frequency which is already closer to the rated frequency of the local AC grid.

19. A power station comprising a plurality of inverters connectable to a local AC grid and a superordinate control unit, which, during a black start, connects the inverters to the local AC grid in accordance with the method that comprises:
  building up a first AC voltage in the local AC grid by a first inverter of the plurality of inverters, and
  connecting a second inverter of the plurality of inverters, after synchronization with the first AC voltage, to the local AC grid,
  wherein the first AC voltage built up by the first inverter is reduced by at least a quarter with respect to a rated voltage of the local AC grid, and
  wherein once the second inverter has been connected, a second AC voltage, which is increased with respect to the first AC voltage, is built up in the local AC grid.

20. The power station as claimed in claim 19, wherein the inverters are connected to photovoltaic generators on an input side.

* * * * *